(12) United States Patent
Przybylski

(10) Patent No.: US 12,024,102 B2
(45) Date of Patent: Jul. 2, 2024

(54) SMART VEHICLE SYSTEMS AND CONTROL LOGIC FOR MONITORING USER DEVICE BATTERIES TO ENABLE VIRTUAL KEY FUNCTIONALITY

(71) Applicant: GM GLOBAL TECHNOLOGY OPERATIONS LLC, Detroit, MI (US)

(72) Inventor: Matthew G. Przybylski, Fenton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 220 days.

(21) Appl. No.: 17/736,647

(22) Filed: May 4, 2022

(65) Prior Publication Data

US 2023/0356677 A1  Nov. 9, 2023

(51) Int. Cl.
| | |
|---|---|
| *B60R 16/03* | (2006.01) |
| *B60R 25/04* | (2013.01) |
| *B60R 25/24* | (2013.01) |
| *B60W 50/14* | (2020.01) |
| *G07C 9/00* | (2020.01) |
| *H02J 7/00* | (2006.01) |

(52) U.S. Cl.
CPC ............. *B60R 16/03* (2013.01); *B60R 25/04* (2013.01); *B60R 25/24* (2013.01); *B60W 50/14* (2013.01); *G07C 9/00309* (2013.01); *H02J 7/0048* (2020.01); *B60W 2050/143* (2013.01); *B60W 2050/146* (2013.01); *G07C 2009/00579* (2013.01); *G07C 2009/00769* (2013.01); *G07C 2209/63* (2013.01)

(58) Field of Classification Search
CPC ....... B60R 16/03; B60R 7/0049; B60R 25/04; B60R 25/24; H02J 7/0048; B60W 50/14; B60W 2050/143; B60W 2550/146; G07C 9/00309; G07C 2009/00579; G07C 2009/00769; G07C 2209/63
USPC ........................................................ 307/10.1
See application file for complete search history.

(56) References Cited

U.S. PATENT DOCUMENTS

| | | | |
|---|---|---|---|
| 7,116,989 | B2 | 10/2006 | Mazzara et al. |
| 7,420,467 | B2 | 9/2008 | Patenaude et al. |
| 8,731,741 | B2 | 5/2014 | Oesterling |
| 8,738,225 | B2 | 5/2014 | Przybylski |
| 9,283,856 | B2 | 3/2016 | Huntzicker et al. |
| 9,955,331 | B2 | 4/2018 | Hrabak et al. |

(Continued)

*Primary Examiner* — Michael R. Fin
(74) *Attorney, Agent, or Firm* — Quinn IP Law

(57) ABSTRACT

Presented are vehicle control systems and logic for monitoring device batteries to provision virtual key functionality, methods for making/using such systems, and vehicles equipped with such systems. A method of operating a vehicle includes wire or wirelessly connecting a remote keyless entry (RKE) system with a wireless-enabled portable electronic device (PED) of a user. A vehicle controller receives a unique virtual key code from the user's PED to enable use of the RKE system and, after receiving the virtual key code, determines a battery charge level of the PED's battery. The vehicle controller then determines if the battery charge level is less than a preset minimum charge level and if the vehicle powertrain is off. If the powertrain is off and the battery charge level is less than the minimum charge level, the controller responsively commands a resident vehicle subsystem to execute a control operation for charging the PED battery.

20 Claims, 2 Drawing Sheets

(56) References Cited

U.S. PATENT DOCUMENTS

| | | |
|---|---|---|
| 10,189,443 B2 | 1/2019 | Niemiec |
| 2014/0343831 A1* | 11/2014 | Hosey .................. H02J 7/0032 |
| | | 324/426 |
| 2019/0084506 A1 | 3/2019 | Gutierrez |
| 2023/0095517 A1* | 3/2023 | Honda .................. B60K 35/80 |
| | | 340/455 |

* cited by examiner

SMART VEHICLE SYSTEMS AND CONTROL LOGIC FOR MONITORING USER DEVICE BATTERIES TO ENABLE VIRTUAL KEY FUNCTIONALITY

INTRODUCTION

The present disclosure relates generally to vehicle access and control systems. More specifically, aspects of this disclosure relate to remote keyless entry (RKE) systems and methods for provisioning user access to and operation of a vehicle using a virtual key.

Current production motor vehicles, such as the modern-day automobile, are originally equipped with a powertrain that operates to propel the vehicle and power the vehicle's onboard electronics. In automotive applications, for example, the vehicle powertrain is generally typified by a prime mover that delivers driving torque through an automatic or manually shifted power transmission to the vehicle's final drive system (e.g., differential, axle shafts, corner modules, road wheels, etc.). Automobiles have historically been powered by a reciprocating-piston type internal combustion engine (ICE) assembly due to its ready availability and relatively inexpensive cost, light weight, and overall efficiency. Such engines include compression-ignited (CI) diesel engines, spark-ignited (SI) gasoline engines, two, four, and six-stroke architectures, and rotary engines, as some non-limiting examples. Hybrid-electric and full-electric vehicles, on the other hand, utilize alternative power sources to propel the vehicle and, thus, minimize or eliminate reliance on a fossil-fuel based engine for tractive power.

Activation of a vehicle's powertrain system has traditionally entailed the user entering the vehicle, physically inserting a cut-blade "toothed" key into a lock cylinder of an ignition switch assembly, and rotating the key to close the primary ignition circuit and thereby activate the prime mover. Likewise, access to many automobiles has historically necessitated a user insert this same key into a mechanical door lock in order to unlock a vehicle door assembly and enter the vehicle's passenger compartment. With the evolution of wireless technology, many modern-day automobiles have supplemented or replaced mechanical toothed keys with remote keyless entry systems that utilize handheld electronic key fobs for wirelessly communicating with the vehicle to enable user access and operation of the vehicle. Access-control key fobs have a wireless transmitter that communicates an encrypted "virtual key" to a dedicated in-vehicle key module that authenticates the virtual key and user location to allow the user to gain access to the vehicle and its functionality.

SUMMARY

Presented herein are intelligent vehicle systems with attendant control logic for monitoring user device batteries to provision virtual key functionality, methods for manufacturing and methods for operating such systems, and motor vehicles equipped with such systems. By way of example, there are disclosed systems and methods for pairing with a user's wireless-enabled electronic device (e.g., smartphone, tablet computer, key fob, smartwatch, etc.,) to verify that the device contains a compatible virtual key and, if so, monitoring a charge percentage (e.g., state of charge (SoC) or depth of discharge (DoD)) of a battery of the device. A battery SoC prediction algorithm, which may operate on the user's device and/or a vehicle controller with a wired or wireless connection to the device, evaluates historical battery use data, bench test data, and/or crowdsourced battery data to estimate an expected battery usage for the device. A predicted departure algorithm, which may operate on the user's device and/or a vehicle controller, will evaluate historical vehicle usage patterns to estimate the typical time until the next vehicle usage. At vehicle shutdown, the system determines if the device battery's SoC is below a calibrated minimum battery SoC for executing a virtual key operation or is expected to be below the minimum battery SoC based on the expected battery usage at the predicted time of the next vehicle use. If so, an automated notification is output to prompt the user to charge their device to ensure the device can execute the virtual key function upon return to the vehicle. An in-vehicle ECU may receive this information, e.g., when powering down the vehicle, and activate a resident display device or audio component to output a message to remind the user to recharge their device. Battery charge tracking can also run when the user is away from the vehicle to produce battery recharge warnings.

Attendant benefits for at least some of the disclosed concepts include vehicle control systems and logic that automate tracking of user device battery charge to ensure continued virtual key functionality. In so doing, disclosed concepts help to minimize or outright eliminate the need for redundant in/on-vehicle backup systems, such as exterior-mounted keypads or dedicated RFID transceivers, to aid users that allow the battery level of their virtual key-compatible device to deplete. To this end, disclosed concepts eliminate the need for additional dedicated hardware or vehicle-to-device connections to automate device battery monitoring and low-charge notifications. Leveraging both the vehicle and the user device as complementary means for alerting the user adds a higher call to action for the user by imploring on them the implications of failing to charge the device, which increases the likelihood that the user will heed the warning and recharge their device.

Aspects of this disclosure are directed to vehicle control systems, system control logic, and closed-loop feedback control techniques for monitoring batteries of user devices to provision virtual key functionality. In an example, a method is presented for operating a motor vehicle with a vehicle powertrain, which is operable to propel the vehicle, and a remote keyless entry (RKE) system, which is operable to open the vehicle and, if desired, to start the vehicle powertrain. This representative method includes, in any order and in any combination with any of the above and below disclosed options and features: connecting, e.g., via a wireless communications device (e.g., BLUETOOTH®, NFC, WiFi, ZIGBEE®) of the vehicle, the RKE system with a wireless-enabled portable electronic device (PED) of a user; receiving, e.g., via a resident or remote vehicle controller from the wireless-enabled PED over the wireless communications device, a unique virtual key code to enable use of the RKE system; determining, e.g., via the vehicle controller responsive to receiving the unique virtual key code, a battery charge level of a rechargeable battery of the wireless-enabled PED; determining when will be a predicted next vehicle use; determining if the battery charge level is less than a memory-stored preset minimum charge level needed at the predicted next vehicle usage; determining, e.g., via the vehicle controller communicating with a powertrain control module (PCM), if the vehicle powertrain is off; and transmitting, e.g., via the vehicle controller responsive to the vehicle powertrain being off and the battery charge level being less than the preset minimum charge level, one or more command signals to one or more resident vehicle subsystems to execute one or more control operations related to charging the PED battery.

Aspects of this disclosure are also directed to computer-readable media (CRM) for automated battery charge tracking and low-charge feedback of a user's virtual key-compatible device. In an example, a non-transitory CRM stores instructions executable by one or more processors of a resident or remote vehicle controller. These instructions, when executed by the processor(s), cause the controller to perform operations, including: connecting the RKE system with a wireless-enabled portable electronic device of a user; receiving, from the wireless-enabled PED, a unique virtual key code authenticatable to enable use of the RKE system; determining, responsive to receiving the unique virtual key code, a battery charge level of a PED battery of the wireless-enabled PED; determining if the battery charge level is less than a preset minimum charge level; determining if the vehicle powertrain is off; and transmitting, responsive to the vehicle powertrain being off and the battery charge level being less than the preset minimum charge level, a command signal to a resident vehicle subsystem of the vehicle to execute a control operation related to charging of the PED battery.

Additional aspects of this disclosure are directed to intelligent motor vehicles with automated user device battery monitoring and virtual key functionality. As used herein, the terms "vehicle" and "motor vehicle" may be used interchangeably and synonymously to include any relevant vehicle platform, such as passenger vehicles (ICE, HEV, FEV, fuel cell, fully and partially autonomous, etc.), commercial vehicles, industrial vehicles, tracked vehicles, off-road and all-terrain vehicles (ATV), motorcycles, farm equipment, watercraft, aircraft, etc. In an example, a motor vehicle includes a vehicle body with a passenger compartment, multiple road wheels mounted to the vehicle body (e.g., via corner modules coupled to a unibody or body-on-frame chassis), and other standard original equipment. A vehicle powertrain, which may employ an internal combustion engine assembly (e.g., for ICE powertrains), an electric traction motor (e.g., for FEV powertrains), or both a traction motor and an engine assembly (e.g., for HEV powertrains), selectively drives one or more of the road wheels to propel the vehicle. A remote keyless system is operable to open and, if desired, start the vehicle.

Continuing with the discussion of the preceding example, the vehicle includes a controller, control module, or network of controllers and/or modules (collectively "controller") that is programmed to connect—by wire or wirelessly—the vehicle's remote keyless system with a user's wireless-enabled portable electronic device. After completing this connection, the controller verifies that the PED is virtual-key compatible by receiving from the user's PED a unique virtual key code that is authenticated to enable use of the RKE system. Upon receiving the unique virtual key code, the controller responsively determines a battery charge level for a battery of the user's PED and then determines if this battery charge level is less than a memory-stored preset minimum charge level. The controller also determines if the vehicle's powertrain is turned off. If the vehicle powertrain is off and the battery charge level is less than the minimum charge level that ensures the device is powered at a next predicted usage time, the controller responsively commands at least one resident vehicle subsystem of the vehicle to execute a control operation to charge the PED battery or alert the driver to charge the PED battery.

For any of the disclosed systems, methods, and vehicles, the vehicle controller may respond to the battery charge level not being less than the preset minimum charge level by estimating a predicted battery depletion for using the wireless-enabled PED for a predefined window of time after the vehicle powertrain is turned off. In this instance, the controller estimates a predicted future battery charge level as a mathematical difference between the battery charge level and the predicted battery depletion, and then determines if the predicted future battery charge level is less than the preset minimum charge level. If so, a command signal may be sent via the vehicle controller to a resident vehicle subsystem to execute a control operation related to charging of the PED battery. Estimating the predicted battery depletion may include the vehicle controller receiving and analyzing historical battery data, bench test battery data, and/or crowdsourced battery data.

For any of the disclosed systems, methods, and vehicles, the vehicle controller may receive one or more user selections from the user via the PED and/or a user input device of the vehicle to modify the preset minimum charge level. In this instance, the preset minimum charge may be set equal to the modified minimum charge level prior to determining if the battery charge level is less than the preset minimum charge level. As yet another option, the vehicle controller may respond to the vehicle powertrain being off and the battery charge level being less than the preset minimum charge level by transmitting an electronic notification to a remote computing service (e.g., back office (BO) server system) indicating that the user is advised to recharge the PED battery, which may be shared to any manner of notification platforms (e.g., web, mobile, email . . . ). The vehicle controller may also respond to the vehicle powertrain being off and the battery charge level being less than the preset minimum charge level by transmitting an electronic notification to the wireless-enabled PED to alert the user that they should recharge the PED battery.

For any of the disclosed systems, methods, and vehicles, the vehicle controller may communicate with a location detection device to receive user location data indicative of a real-time user location of the user, and determine if the user's real-time location is inside the vehicle's passenger compartment or within a predefined proximity to the vehicle. In this example, the user's PED is paired with the vehicle's RKE system and evaluated for virtual-key compatibility upon confirming that the user's real-time location is within the passenger compartment and/or within proximity to the vehicle. As another option, the vehicle controller may authenticate the unique virtual key code and, once authenticated, activate the vehicle's RKE system such that the user may enter and/or start the vehicle.

For any of the disclosed systems, methods, and vehicles, the wireless-enabled PED is a smartphone, tablet computer, personal digital assistant (PDA), smartwatch, etc., running a dedicated mobile application. In this example, the virtual key code is sent by the dedicated mobile application to the RKE system after the RKE system is connected with the user's PED. This mobile application, even when not opened by the user, may run a background protocol for exchanging battery level data, virtual key functionality, etc. To determine the PED's battery charge level, the vehicle controller may receive, via a wired or wireless connection, real-time battery level data from the user's PED. In addition or alternatively, determining the PED's battery charge level may include the vehicle controller estimating a predicted battery charge level based on accumulated historical battery data, bench test battery data, crowdsourced battery data, etc.

For any of the disclosed systems, methods, and vehicles, the resident vehicle subsystem includes a display device that is mounted inside a passenger compartment of the vehicle (e.g., a touchscreen video display of a center-stack mounted telematics unit). In this instance, the controller-automated control operation may include the display device displaying a notification to the user to charge their PED battery. As another option, the resident vehicle subsystem may include one or more speaker components each mounted inside the vehicle's passenger compartment (e.g., audio speakers of an in-vehicle audio system). In this instance, the controller-automated control operation may include the speaker component(s) outputting a notification to charge their PED battery.

The above Summary is not intended to represent every embodiment or every aspect of the present disclosure. Rather, the foregoing summary merely provides an exemplification of some of the novel concepts and features set forth herein. The above features and advantages, and other features and attendant advantages of this disclosure, will be readily apparent from the following detailed description of illustrated examples and representative modes for carrying out the present disclosure when taken in connection with the accompanying drawings and the appended claims. Moreover, this disclosure expressly includes any and all combinations and subcombinations of the elements and features presented above and below.

Figure 1:
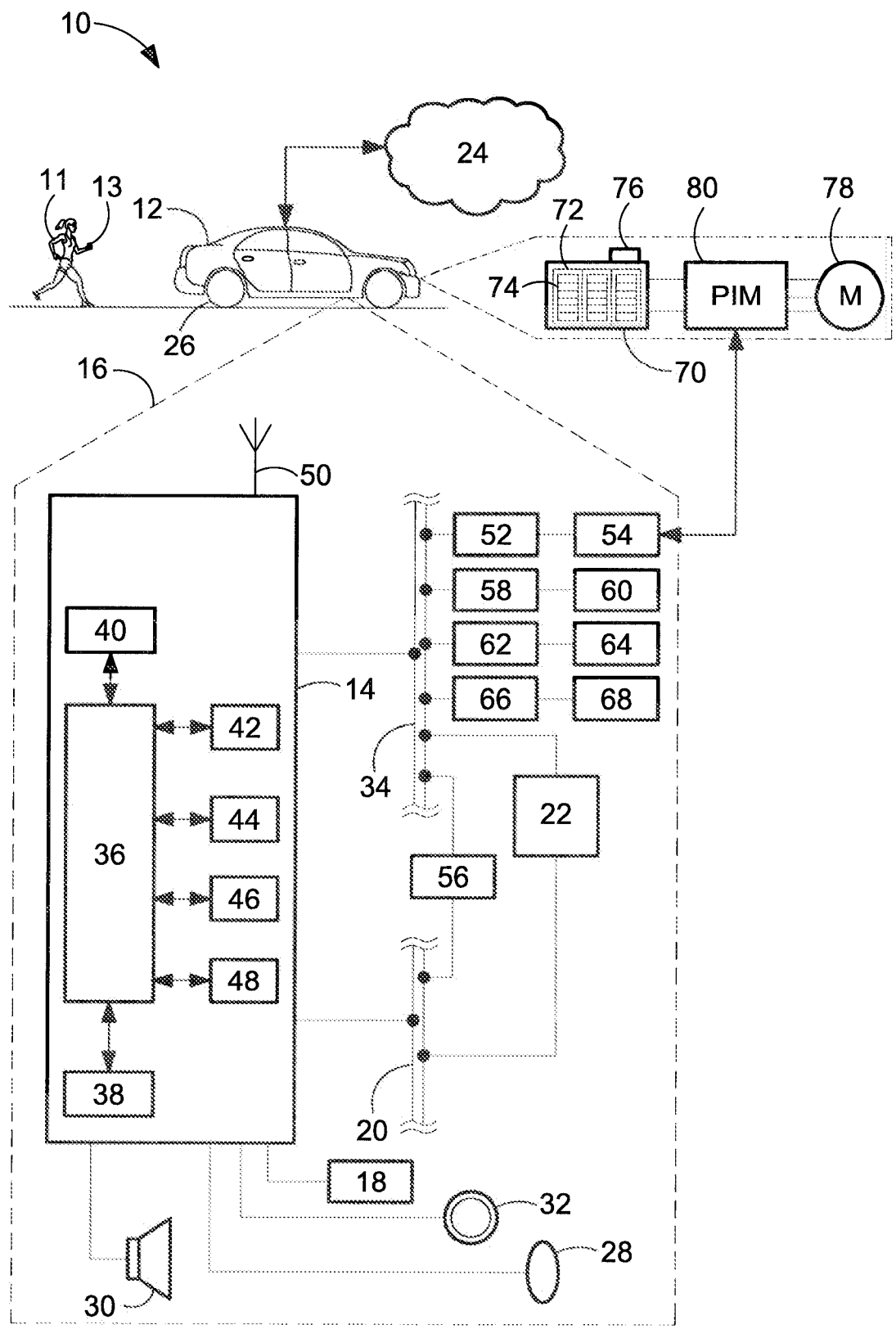
FIG. 1 is a partially schematic, side-view illustration of a representative motor vehicle with an electrified powertrain, a rechargeable energy storage system, and a network of in-vehicle controllers, sensing devices, and communication devices for monitoring a battery of a user's portable electronic device and provisioning virtual key functionality in accordance with aspects of the disclosed concepts.

The present disclosure is amenable to various modifications and alternative forms, and some representative embodiments are shown by way of example in the drawings and will be described in detail herein. It should be understood, however, that the novel aspects of this disclosure are not limited to the particular forms illustrated in the above-enumerated drawings. Rather, this disclosure covers all modifications, equivalents, combinations, subcombinations, permutations, groupings, and alternatives falling within the scope of this disclosure as encompassed, for example, by the appended claims.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, and Detailed Description sections, but not explicitly set forth in the claims, should not be incorporated into the claims, singly or collectively, by implication, inference or otherwise.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle when the vehicle is operatively oriented on a horizontal driving surface.

Referring now to the drawings, wherein like reference numbers refer to like features throughout the several views, there is shown in FIG. 1 a representative automobile, which is designated generally at 10 and portrayed herein for purposes of discussion as a sedan-style, electric-drive passenger vehicle. The illustrated automobile 10—also referred to herein as "motor vehicle" or "vehicle" for short—is merely an exemplary application with which novel aspects of this disclosure may be practiced. In the same vein, incorporation of the present concepts into an FEV powertrain should be appreciated as a non-limiting implementation of disclosed features. As such, it will be understood that aspects and features of this disclosure may be applied to other powertrain architectures, incorporated into any logically relevant type of motor vehicle, and utilized for an endless assortment of wireless-enabled, portable electronic devices (PED). Moreover, only select components of the motor vehicles and user PEDs are shown and described in additional detail herein. Nevertheless, the vehicles, systems and devices discussed below may include numerous additional and alternative features, and other available peripheral components, for carrying out the various methods and functions of this disclosure.

The representative vehicle 10 of FIG. 1 is originally equipped with a vehicle telecommunication and information ("telematics") unit 14 that wirelessly communicates, e.g., via cell towers, base stations, mobile switching centers, satellite service, etc., with a remotely located or "off-board" cloud computing host service 24 (e.g., ONSTAR®). Some of the other vehicle hardware components 16 shown generally in FIG. 1 include, as non-limiting examples, an electronic video display device 18, a microphone 28, audio speakers 30, and assorted user input controls 32 (e.g., buttons, knobs, pedals, switches, touchpads, joysticks, touchscreens, etc.). These hardware components 16 function, in part, as a human/machine interface (HMI) that enables a user to communicate with the telematics unit 14 and other components resident to and remote from the vehicle 10. Microphone 28 provides a vehicle occupant with means to input verbal or other auditory commands; the vehicle 10 may be equipped with an embedded voice-processing unit utilizing audio filtering, editing, and analysis modules. Conversely, the speakers 30 provide audible output to a vehicle occupant and may be either a stand-alone speaker dedicated for use with the telematics unit 14 or may be part of an audio system 22. The audio system 22 is operatively connected to a network connection interface 34 and an audio bus 20 to receive analog information, rendering it as sound, via one or more speaker components.

Communicatively coupled to the telematics unit 14 is a network connection interface 34, suitable examples of which include twisted pair/fiber optic Ethernet switches, parallel/serial communications buses, local area network (LAN) interfaces, controller area network (CAN) interfaces, and the like. Other appropriate communication interfaces may include those that conform with ISO, SAE, and/or IEEE standards and specifications. The network connection interface 34 enables the vehicle hardware 16 to send and receive signals with one another and with various systems and subsystems both onboard the vehicle body 12 and off-board the vehicle body 12. This allows the vehicle 10 to perform assorted vehicle functions, such as starting, stopping, and modulating powertrain output, governing operation of the vehicle's transmission, activating the friction and regenerative brake systems, controlling vehicle steering, regulating charge and discharge of the vehicle's battery pack(s), controlling the vehicle's electromechanical door locks, and other automated functions. For instance, telematics unit 14 receives and transmits signals and data to/from a Powertrain Control Module (PCM) 52, an Advanced Driver Assistance System (ADAS) module 54, an Electronic Battery Control Module (EBCM) 56, a Steering Control Module (SCM) 58, a Brake System Control Module (BSCM) 60, and assorted other vehicle ECUs, such as a transmission control module (TCM), engine control module (ECM), Remote Keyless Entry system, Sensor System Interface Module (SSIM), etc.

With continuing reference to FIG. 1, telematics unit 14 is an onboard computing device that provides a mixture of services, both individually and through its communication with other networked devices. This telematics unit 14 is generally composed of one or more processors 40, each of which may be embodied as a discrete microprocessor, an application specific integrated circuit (ASIC), or a dedicated control module. Vehicle 10 may offer centralized vehicle control via a central processing unit (CPU) 36 that is operatively coupled to a real-time clock (RTC) 42 and one or more electronic memory devices 38, each of which may take on the form of a CD-ROM, magnetic disk, IC device, flash memory, semiconductor memory (e.g., various types of RAM or ROM), etc.

Wireless long-range communication (LRC) capabilities with remote, off-board devices may be provided via one or more or all of a cellular chipset/component, a navigation and location chipset/component (e.g., global positioning system (GPS) transceiver), or a wireless modem, all of which are collectively represented at 44 in FIG. 1. Wireless short-range communication (SRC) connectivity may be provided via a short-range wireless communications device 46 (e.g., a BLUETOOTH® unit, radio frequency identification (RFID) tag/reader, or near field communications (NFC) transceiver, ZIGBEE® device, etc.), a dedicated short-range communications (DSRC) component 48, and/or a dual antenna 50. It should be understood that the vehicle 10 may be implemented without one or more of the above-listed components or, optionally, may include additional components and functionality as desired for a particular end use. The communications devices described above may provision data exchanges as part of a periodic broadcast in a vehicle-to-vehicle (V2V) communication system or a vehicle-to-everything (V2X) communication system, e.g., Vehicle-to-Infrastructure (V2I), Vehicle-to-Pedestrian (V2P), Vehicle-to-Device (V2D), etc.

CPU 36 receives sensor data from one or more sensing devices that use, for example, photo detection, radar, laser, ultrasonic, optical, infrared, or other suitable technology, including short range communications technologies (e.g., DSRC) or Ultra-Wide Band (UWB) radio technologies, e.g., for executing an automated vehicle operation or a vehicle navigation service. In accord with the illustrated example, the automobile 10 may be equipped with one or more digital cameras 62, one or more range sensors 64, one or more vehicle speed sensors 66, one or more vehicle dynamics sensors 68, and any requisite filtering, classification, fusion, and analysis hardware and software for processing raw sensor data. The type, placement, number, and interoperability of the distributed array of in-vehicle sensors may be adapted, singly or collectively, to a given vehicle platform, e.g., for achieving a desired level of autonomous vehicle operation.

To propel the motor vehicle 10, an electrified powertrain is operable to generate and deliver tractive torque to one or more of the vehicle's drive wheels 26. The powertrain is generally represented in FIG. 1 by a rechargeable energy storage system (RESS), which may be in the nature of a chassis-mounted traction battery pack 70, that is operatively connected to an electric traction motor 78. The traction battery pack 70 is generally composed of one or more battery modules 72 each having a stack of battery cells 74, such as lithium ion, lithium polymer, or nickel metal hydride battery cells of the pouch, can, or prismatic type. One or more electric machines, such as traction motor/generator (M) units 78, draw electrical power from and, optionally, deliver electrical power to the battery pack 70. A power inverter module (PIM) 80 electrically connects the battery pack 70 to the motor/generator unit(s) 78 and modulates the transfer of electrical current therebetween. Disclosed concepts are similarly applicable to HEV and ICE-based powertrains.

The battery pack 70 may be configured such that module management, cell sensing, and module-to-module or module-to-host communication functionality is integrated directly into each battery module 72 and performed wirelessly via a wireless-enabled cell monitoring unit (CMU) 76. The CMU 76 may be a microcontroller-based, printed circuit board (PCB)-mounted sensor array. Each CMU 76 may have a GPS transceiver and RF capabilities and may be packaged on or in a battery module housing. The battery module cells 74, CMU 76, housing, coolant lines, busbars, etc., collectively define the cell module assembly.

With continuing reference to FIG. 1, the motor vehicle 10 provisions flexible monitoring, management, and alert services for wireless-enabled portable electronic devices that are entering or within one of the available compartments of the vehicle 10. As used herein, the terms "portable electronic device" or "PED" may be defined to include any handheld personal computing device that comes manufacturer equipped with or to which may be connected a wireless communication device. By way of non-limiting example, FIG. 1 illustrates a single user—driver 11—communicating with a single motor vehicle—automobile 10—using a single PED, illustrated as a handheld cellular and wireless-enabled smartphone 13. With that said, it is envisioned that any number of users may communicate with any number of vehicles with a variety of distinct device types that are suitably equipped for short-range exchanges of information and data. In this regard, the user's smartphone 13 may communicate directly with the telematics unit 14 of motor vehicle 10 using a short-range communication (SRC) device, examples of which include a BLUETOOTH® or near field communication (NFC) or infrared (IR) transceiver, a radio frequency identification (RFID) tag, a dedicated short-range communications (DSRC) component, a wireless fidelity (WiFi) module, a ZIGBEE® device, etc.

A virtual key—also referred to as a "digital car key" or "digital key"—is a unique and authenticatable code that is assigned to a particular vehicle and is transmittable to provide a user with vehicle access and, if desired, other predefined functionality (e.g., remote start/stop, in-vehicle start/stop, remote door lock/unlock, remote cabin thermal management, etc.). The virtual key may be stored within and wirelessly transmitted to the vehicle by a handheld PED or a dedicated mobile software application ("app") operating on the PED. Wireless short-range communication may enable the handheld PED to automatically communicate the virtual key to a dedicated virtual key module of the vehicle when the PED/user is within a predetermined distance (e.g., five (5) to ten (10) meters (m)). Wireless LRC functionality may enable the user to access the vehicle from a remote location and transmit the virtual key to the vehicle's virtual key module for authentication and user access. In another non-limiting example, the user's PED communicates the virtual key to the virtual key module when the PED is inside the vehicle and/or in physical contact with a virtual key module interface, for example, when the virtual-key enabled device touches a door-handle of the vehicle, a designated receptable within the vehicle, etc.

Discussed below are systems, methods, and devices for tracking a battery charge status of a rechargeable battery of a user's virtual key compatible-PED and automating a battery charge alert to ensure continued virtual key functionality. By way of example, and not limitation, a mobile app running in the foreground or background of the driver's 11 smartphone 13 selectively accesses state of charge (SoC) data for the smartphone's rechargeable Li-class battery. The mobile app wirelessly connects with the driver's vehicle 10—either independently or through user input on the smartphone 13—to confirm that the vehicle 10 has virtual key functionality. For instance, the mobile app may continuously run a background process for automatically pairing via BLUETOOTH, USB, and/or Wifi to the vehicle's telematics unit 14. The mobile app may track and store the driver's daily PED/battery use and use trends, daily departure times, daily trip ranges and durations, etc. Using this information, the PED's mobile app may execute a battery charge estimation algorithm to predict a time to smartphone battery depletion for a given day/time/trip.

Stored within or retrievable by the mobile app is a calibratable minimum battery charge level (e.g., 10±3% SoC) that is needed to ensure the PED battery will have a sufficient charge to complete a subsequent virtual key operation for accessing and operating the vehicle 10. The driver 11 may be asked to give the PED/mobile app permission to notify the driver 11 on their smartphone display or via text/SMS, push, popup, personal email, etc. In the same vein, the driver may be asked to authorize the PED/mobile app sharing alerts and related PED data with a remote back-office (BO) service, such as cloud computing service 24, so that notifications may be transmitted through other applications or virtual environments, like an internet home page or web-portal dashboard. The smartphone 13 may automatically share battery status information with the telematics unit 24 when it is connected therewith through any method and the vehicle 10 is in an on state.

User device battery monitoring and virtual key functionality may also be performed by an in-vehicle infotainment device, such as telematics unit 14 of FIG. 1, either independently or with routine user device feedback. Continuing with the above example, the telematics unit 14 retrieves or derives a real-time or estimated state of charge for the battery of smartphone 13 and concurrently monitors the powertrain's ignition status and logs typical times of day the vehicle 10 is used by the driver 11. The telematics unit 14 may execute a battery charge estimation algorithm to predict a rate of phone battery discharge and, from this predicted value, may project if the smartphone battery's current state of charge will ensure sufficient battery charge at the next typical time of vehicle use to unlock and key-on the vehicle 10.

When the telematics unit 14 detects that the vehicle 10 has been turned off and that the projected smartphone battery life is not sufficient to be powered at the next expected drive cycle, the telematics unit 14 automates a visual, audible, and/or tactile alert (e.g., warning display and chime) to notify the driver 11 to charge the smartphone 13 before returning to ensure their virtual key access to the vehicle 10 will still work. Telematics display device 18 may display related alerts and information when the vehicle 10 is fully powered on, fully powered off, or in an accessory mode.

Figure 2:
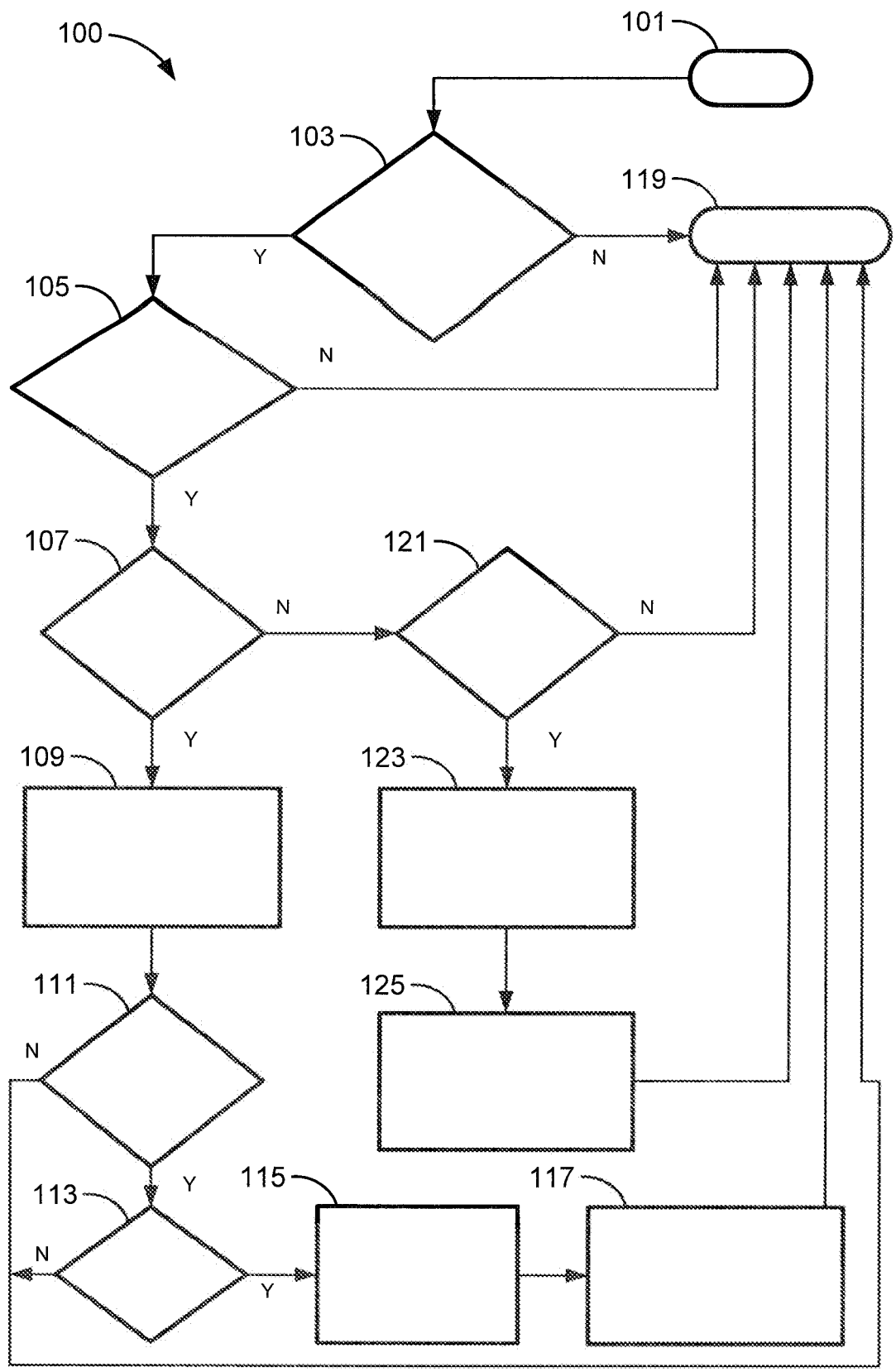
FIG. 2 is a flowchart illustrating a representative user device battery tracking algorithm to provision virtual-key enabled access to and operation of a vehicle, which may correspond to memory-stored instructions that are executable by a resident or remote controller, control-logic circuit, programmable control unit, or other integrated circuit (IC) device or network of devices in accord with aspects of the disclosed concepts.

With reference next to the flow chart of FIG. 2, an improved method or control strategy for monitoring a battery charge level of a wireless-enabled PED, such as smartphone 13 of FIG. 1, to enable virtual key functionality with a host vehicle, such as automobile 10 of FIG. 1, is generally described at 100 in accordance with aspects of the present disclosure. Some or all of the operations illustrated in FIG. 2 and described in further detail below may be representative of an algorithm that corresponds to processor-executable instructions that are stored, for example, in main or auxiliary or remote memory (e.g., memory device 38 of FIG. 1), and executed, for example, by an electronic controller, processing unit, logic circuit, or other module or device or network of modules/devices (e.g., CPU 36 and/or cloud computing service 24 of FIG. 1), to perform any or all of the above and below described functions associated with the disclosed concepts. It should be recognized that the order of execution of the illustrated operation blocks may be changed, additional operation blocks may be added, and some of the described operations may be modified, combined, or eliminated.

Method 100 begins at START terminal block 101 of FIG. 2 with memory-stored, processor-executable instructions for a programmable controller or control module or similarly suitable processor to call up an initialization procedure for a virtual key activation protocol. This routine may be executed in real-time, near real-time, continuously, systematically, sporadically, and/or at regular intervals, for example, each 10 or 100 milliseconds during regular and routine operation of the motor vehicle 10. As yet another option, terminal block 101 may initialize responsive to a user command prompt, a resident vehicle controller prompt, or a broadcast prompt signal received from an "off-board" centralized vehicle services system (e.g., host cloud computing service 24). By way of non-limiting example, a device pairing process may be running in the background of the smartphone 13 when the driver 11 approaches the vehicle 10. At the same time, a complementary pairing module runs on the vehicle telematics unit 14 inside the passenger compartment of vehicle 10. Upon detection of the smartphone 13 device, e.g., when detected within proximity of the vehicle 10 (NFC) or within the vehicle's passenger compartment (BLUETOOTH, cable, WiFi, etc.), the telematics unit 14 and/or smartphone 13 may initialize method 100. Upon completion of some or all of the control operations presented in FIG. 2, the method 100 may advance to END terminal block 119 and temporarily terminate or, optionally, may loop back to terminal block 101 and run in a continuous loop.

From terminal block 101, method 100 advances to MOBILE APP decision block 103 to determine if a user has a wireless-enabled portable electronic device and, if so, whether or not that PED has the requisite software installed and active on the device. The factory installed operating system and software programming of smartphone 13 may contain all requisite applications for performing any desired virtual key processes. Alternatively, the driver 11 may download a dedicated mobile software application (ONSTAR® MYLINK®) to their smartphone 13 and validate the application for use with the vehicle 10. Using this app, the driver 11 is able to create a user account, identify their vehicle, and retrieve a unique virtual key code for enabling virtual key functionality on the vehicle 10. Device recognition and authentication may be performed by the telematics unit 14 during a first pairing of the smartphone 13 with the vehicle 10, which may include the smartphone 13 transmitting the virtual key code to the vehicle 10 to enable use of the vehicle's RKE system. If the user does not have a wireless-enabled PED or the user's wireless-enabled PED is not virtual key ready (block 103=NO), method 100 may move to terminal block 119 and temporarily terminate.

After verifying that the user has a wireless-enabled PED and the user's device is virtual key compatible (block 103=YES), method 100 executes VIRTUAL KEY decision block 105 to determine if the host vehicle has virtual key functionality that is both installed and active on the vehicle. Vehicle 10 of FIG. 1, for example, may come originally equipped from the manufacturer with a standalone virtual key device or an embedded virtual key module that operates within an existing hardware component, such as telematics unit 14. Aftermarket digital car key units and attendant software may also be installed into the vehicle 10 and operatively mated with the smartphone 13. It should be appreciated that decision blocks 103 and 105 may be reversed or, if virtual key compatibility and interoperability between the driver's smartphone 13 and vehicle 10 have already been confirmed, may be altogether omitted from method 100. If the user's vehicle is not virtual key compatible (block 105=NO), method 100 may responsively move to terminal block 119 and temporarily terminate.

Upon confirming that the host vehicle has virtual key functionality that is both installed and active (block 105=YES), method 100 advances to DEVICE PAIRED decision block 107 to determine if the user's PED is properly paired with the host vehicle. In contrast to establishing a mere communication link between two electronic devices, device "pairing" may be typified by an exchange of a device's unique identification information with an attendant vetting and approval process. For a basic comm link, smartphone 13 may be linked to the vehicle 10 via a USB port and USB compatible connector to charge the device and play music from the device. In contrast, the smartphone 13 may establish a preliminary link (e.g., via BLUETOOTH®), submit a pair request to the vehicle, provide the vehicle with unique identification data (e.g., a device-specific passkey pin), and be approved for pairing. The pairing process may create a link key that is used to encrypt wireless communications on the paired comm link. If the user's wireless-enabled PED is not paired with or cannot pair to the host vehicle (block 107=NO), method 100 will optionally execute decision block 121 or alternatively terminate at terminal block 119.

When the user's wireless-enabled PED is paired with the host vehicle (block 107=YES), method 100 responsively executes BATTERY CHARGE data input/output block 109 to determine a battery charge level of a rechargeable battery of the wireless-enabled PED. A present battery charge level for the lithium-class battery of smartphone 13 may be ascertained, for example, by the vehicle telematics unit 14 retrieving real-time battery level data (e.g., state of charge (SoC) or depth of discharge (DoD)) from the smartphone 13. As another option, the vehicle telematics unit 14 may employ a machine learning algorithm (e.g., an artificial neural network (ANN)) or a predictive modeling (PM) technique (e.g., a Gaussian mixture model) to predict a present or future battery charge level based on historical battery data specific to the driver's smartphone 13, bench test battery data for the make/model of the smartphone 13, and/or crowdsourced battery data for participating third-party entities using the same or similar make/model of the smartphone 13.

With continuing reference to FIG. 2, method 100 advances to THRESHOLD LEVEL—ONBOARD decision block 111 to determine if the battery charge level of the user's wireless-enabled PED is less than a preset minimum charge level. This minimum charge level may be a manufacturer-specified, battery-specific threshold value calibrated to the make/model of the Li-class battery that ensures the smartphone 13 will be sufficiently charged to complete a subsequent virtual key operation upon return of the driver 11 to the vehicle 10, e.g., at a predicted next vehicle use day/time. Alternatively, the preset minimum charge level may be derived by the CPU 36 based on a ML ANN/PM analysis of historical battery data, bench test battery data, and/or crowdsourced battery data. Once derived, the minimum charge level may be stored in resident memory device 38 or retrieved from a remote source, such as cloud computing host service 24. As yet another option, the driver 11 may enter one or more selections, e.g., via smartphone 13 or telematics user input controls 32, to set or modify the minimum charge level. Telematics CPU 36 may update the memory-stored value to set the minimum charge level equal to the modified minimum charge level prior to conducting the evaluation at decision block 111.

If the battery charge level is not below the preset minimum charge level, e.g., when the user is exiting the host vehicle, the CPU 36 may estimate a predicted battery depletion value for continued use of the smartphone 13 by the driver 11 for a predefined window of time after the vehicle's powertrain has been turned off (e.g., eight (8) hours before the next predicted departure time). The CPU 36 may estimate a predicted future battery charge level as the mathematical difference between the present battery charge level (e.g., 45% SoC) and the predicted battery depletion (e.g., 35% estimated depletion). If the predicted future battery charge level is less than the preset minimum charge level, decision block 111 may be flagged as YES. If the present battery charge level (and/or the future battery charge level) is not less than the preset minimum charge level (block 111=NO), method 100 may responsively terminate at block 119.

Prior to, contemporaneous with, or after confirming that the present and/or predicted future charge level of the PED battery is less than the preset minimum charge level (block 111=YES), method 100 executes VEHICLE IGNITION decision block 113 to determine if the vehicle's powertrain is off. In the non-limiting example of FIG. 1, the driver 11 may initiate a vehicle key-off event by depressing a motor start/stop button inside the passenger compartment or by powering off the powertrain using a start/stop soft key in the dedicated digital car key app operating on their smartphone 13. For autonomous vehicle applications, vehicle key-on and key-off events may be effected by the host vehicle rather than a driver or other occupant. If the vehicle powertrain is not off or in the process of being turned off (block 113=NO), method 100 may responsively terminate at block 119.

Upon confirming that the host vehicle's powertrain is off or being turned off (block 113=YES), method 100 will execute CONTROL OPERATION process block 115 to automate a remediating action for the depleted PED battery to ensure continued virtual key functionality. Vehicle telematics unit 14 of FIG. 1, for example, may automatically generate a notification to warn the driver 11 to recharge the smartphone 13; this notification may be shown as a visual alert on touchscreen video display device 18 or output as an audible alert on audio speakers 30. In-vehicle lighting, haptic, and horn systems may also be employed to provide audible, tactile, and visible feedback, respectively, to a user. Other optional automated responses may include wired/wirelessly recharging the PED battery or automatically unlocking the vehicle (pending driver preapproval) at the predicted departure time. At BACKOFFICE process block 117, the telematics CPU 36 may further respond to the vehicle being off and the battery charge level being too low by transmitting an electronic notification to a back office (BO) computing service (e.g., cloud computing host service 24) indicating that the user is advised to recharge the PED battery. This remotely located BO service may then transmit complementary notifications to the user using other notification channels.

If the user's wireless-enabled PED is not paired with the host vehicle (block 107=NO), e.g., because the user is not inside the vehicle passenger compartment or within proximity of the host vehicle to secure a paired comm link connection, method 100 may execute THRESHOLD LEVEL— OFFBOARD decision block 121 to determine if the PED battery's charge level is less than the threshold minimum charge level. If not (block 121=NO), method 100 may terminate at terminal block 119; if so (block 121=YES), method 100 may execute PED CONTROL OPERATION process block 123 to automate a remediating action for the depleted PED battery. For instance, the smartphone 13 of FIG. 1 may display on a touchscreen PED display device a popup alert, push notification, text message, SMS, etc., and output on a PED speaker component an optional warning "chirp" to notify the user that battery charging is recommended. At PED—BO process block 125, the user's wireless-enabled PED may transmit an electronic notification to the back-office computing service indicating that the user is advised to recharge their PED. For at least some implementations, the procedures carried out at process blocks 121, 123 and 125 may be substantially identical or otherwise include the associated procedures, options, and alternatives described above with respect to decision blocks 111, 115 and 117, respectively. It may also be desirable that the processors-executable instructions for process blocks 121, 123 and/or 125 be stored in and executed by the user's PED.

Aspects of this disclosure may be implemented, in some embodiments, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software, or a combination thereof, in a computer system or other processing system.

Any of the methods described herein may include machine readable instructions for execution by: (a) a processor, (b) a controller, and/or (c) any other suitable processing device. Any algorithm, software, control logic, protocol or method disclosed herein may be embodied as software stored on a tangible medium such as, for example, a flash memory, a solid-state drive (SSD) memory, a hard-disk drive (HDD) memory, a CD-ROM, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms may be described with reference to flowcharts and/or workflow diagrams depicted herein, many other methods for implementing the example machine-readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A method of operating a vehicle with a vehicle controller, a remote keyless entry (RKE) system operable to unlock and/or start the vehicle, and a vehicle powertrain operable to propel the vehicle, the method comprising:

receiving, via the vehicle controller, user location data indicative of a real-time user location of a user;

determining, via the vehicle controller, if the real-time user location is within a passenger compartment of the vehicle and/or within a predefined proximity to the vehicle;

connecting, via a wireless communications device of the vehicle, the RKE system with a wireless-enabled portable electronic device (PED) of the user, the connecting including pairing the RKE system with the wireless-enabled PED responsive to the real-time user location being within the passenger compartment of and/or the predefined proximity to the vehicle;

receiving, via the vehicle controller from the wireless-enabled PED over the wireless communications device, a unique virtual key code to enable use of the RKE system;

determining, via the vehicle controller, a battery charge level of a PED battery of the wireless-enabled PED;

determining if the battery charge level is less than a preset minimum charge level;

determining if the vehicle powertrain is off; and transmitting, via the vehicle controller responsive to the vehicle powertrain being off and the battery charge level being less than the preset minimum charge level, a command signal to a resident vehicle subsystem to execute a control operation related to charging of the PED battery.

2. A method of operating a vehicle with a vehicle controller, a remote keyless entry (RKE) system operable to unlock and/or start the vehicle, and a vehicle powertrain operable to propel the vehicle, the method comprising:

connecting, via a wireless communications device of the vehicle, the RKE system with a wireless-enabled portable electronic device (PED) of a user;

receiving, via the vehicle controller from the wireless-enabled PED, a unique virtual key code to enable use of the RKE system;

determining, via the vehicle controller, if a battery charge level of a PED battery of the wireless-enabled PED is less than a preset minimum charge level;

determining if the vehicle powertrain is off;

transmitting, via the vehicle controller responsive to the vehicle powertrain being off and the battery charge level being less than the preset minimum charge level, a command signal to a resident vehicle subsystem to execute a control operation related to charging the PED battery;

estimating, responsive to the battery charge level not being less than the preset minimum charge level, a predicted battery depletion associated with use of the wireless-enabled PED by the user for a predefined window of time after the vehicle powertrain is turned off;

estimating a predicted future battery charge level as a difference between the battery charge level and the predicted battery depletion; and determining if the predicted future battery charge level is less than the preset minimum charge level, wherein the command signal is also sent via the vehicle controller to the resident vehicle subsystem responsive to the predicted future battery charge level being less than the preset minimum charge level.

3. The method of claim 2, wherein estimating the predicted battery depletion includes the vehicle controller receiving and analyzing historical battery data, bench test battery data, and/or crowdsourced battery data.

4. The method of claim 1, further comprising:

receiving, via the vehicle controller from the user via the wireless-enabled PED or a user input device of the vehicle, a selection to change the preset minimum charge level to a modified minimum charge level; and setting the preset minimum charge level equal to the modified minimum charge level prior to determining if the battery charge level is less than the preset minimum charge level.

5. The method of claim 1, further comprising transmitting, via the vehicle controller responsive to the vehicle powertrain being off and the battery charge level being less than the preset minimum charge level, an electronic notification to a remote computing service indicating the user is advised to recharge the PED battery.

6. The method of claim 1, further comprising transmitting, via the vehicle controller responsive to the vehicle powertrain being off and the battery charge level being less than the preset minimum charge level, an electronic notification to the wireless-enabled PED alerting the user to recharge the PED battery.

7. The method of claim 2, further comprising:

receiving, via the vehicle controller from a location detection device, user location data indicative of a real-time user location of the user; and determining, via the vehicle controller, if the real-time user location is within a passenger compartment of and/or a predefined proximity to the vehicle, wherein the connecting includes pairing the RKE system with the wireless-enabled PED responsive to the real-time user location being within the passenger compartment of and/or the predefined proximity to the vehicle.

8. The method of claim 1, further comprising authenticating, via the vehicle controller, the unique virtual key code to activate the RKE system of the vehicle.

9. The method of claim 1, wherein the wireless-enabled PED is a smartphone with a dedicated mobile application, and wherein the unique virtual key code is sent by the dedicated mobile application to the RKE system after the RKE system is connected with the wireless-enabled PED.

10. The method of claim 1, wherein determining the battery charge level of the PED battery includes the vehicle controller receiving, via a wired or wireless connection, real-time battery level data from the wireless-enabled PED.

11. The method of claim 1, wherein determining the battery charge level of the PED battery includes the vehicle controller estimating a predicted battery charge level based on historical battery data, bench test battery data, and/or crowdsourced battery data.

12. The method of claim 1, wherein the resident vehicle subsystem includes a display device mounted inside a passenger compartment of the vehicle, and wherein the control operation includes the display device displaying a notification to the user to charge the PED battery.

13. The method of claim 1, wherein the resident vehicle subsystem includes a speaker component mounted inside a passenger compartment of the vehicle, and wherein the control operation includes the speaker component outputting a notification to charge the PED battery.

14. A non-transitory, computer-readable medium storing instructions executable by one or more processors of a vehicle controller of a vehicle, the vehicle including a remote keyless entry (RKE) system and a vehicle powertrain, the instructions, when executed by the one or more processors, causing the vehicle controller to perform operations comprising:

receiving user location data indicative of a real-time user location of a user;

determining if the real-time user location is within a passenger compartment of the vehicle and/or within a predefined proximity to the vehicle;

pairing the RKE system with a wireless-enabled portable electronic device (PED) of the user responsive to the real-time user location being within the passenger compartment of and/or the predefined proximity to the vehicle;

receiving, from the wireless-enabled PED, a unique virtual key code authenticatable to enable use of the RKE system;

determining a battery charge level of a PED battery of the wireless-enabled PED;

determining if the battery charge level is less than a preset minimum charge level;

determining if the vehicle powertrain is off; and transmitting, responsive to the vehicle powertrain being off and the battery charge level being less than the preset minimum charge level, a command signal to a resident vehicle subsystem of the vehicle to execute a control operation related to charging of the PED battery.

15. A motor vehicle, comprising:
a vehicle body with a passenger compartment;
a plurality of road wheels attached to the vehicle body;
a vehicle powertrain attached to the vehicle body and operable to drive one or more of the road wheels to thereby propel the motor vehicle;
a remote keyless entry (RKE) system operable to unlock and start the motor vehicle; and
a vehicle controller programmed to:
receive user location data indicative of a real-time user location of a user;
determine if the real-time user location is within the passenger compartment of the motor vehicle and/or within a predefined proximity to the motor vehicle;
pair the RKE system with a wireless-enabled portable electronic device (PED) of the user responsive to the real-time user location being within the passenger compartment of and/or the predefined proximity to the motor vehicle;
receive from the wireless-enabled PED a unique virtual key code to enable use of the RKE system;
determine a battery charge level of a PED battery of the wireless-enabled PED;
determine if the battery charge level is less than a preset minimum charge level;
determine if the vehicle powertrain is off; and
responsive to the vehicle powertrain being off and the battery charge level being less than the preset minimum charge level, transmit a command signal to a resident vehicle subsystem of the motor vehicle to execute a control operation related to charging of the PED battery.

16. The motor vehicle of claim 15, wherein the vehicle controller is further programmed to:
receive, from the user via a user input device, a selection to change the preset minimum charge level to a modified minimum charge level; and
set the preset minimum charge level equal to the modified minimum charge level prior to determining if the battery charge level is less than the preset minimum charge level.

17. The motor vehicle of claim 15, wherein the vehicle controller is further programmed to:
authenticate the unique virtual key code; and
enable the user to unlock and/or start the motor vehicle using the RKE system.

18. The motor vehicle of claim 15, wherein the wireless-enabled PED is a smartphone with a dedicated mobile application operable on the wireless-enabled PED, and wherein the unique virtual key code is sent by the dedicated mobile application to the RKE system after the RKE system is connected with the wireless-enabled PED.

19. The motor vehicle of claim 15, wherein the vehicle controller is further programmed to transmit an electronic notification to the wireless-enabled PED alerting the user to recharge the PED battery responsive to the vehicle powertrain being off and the battery charge level being less than the preset minimum charge level.

20. The motor vehicle of claim 15, wherein the resident vehicle subsystem includes a display device and/or a speaker component mounted inside the passenger compartment of the motor vehicle, and wherein the control operation includes the display device displaying and/or the speaker component outputting a notification to the user to charge the PED battery.

* * * * *